United States Patent
Abend

(10) Patent No.: US 6,524,253 B1
(45) Date of Patent: Feb. 25, 2003

(54) VOLUMETRIC ULTRASOUND IMAGING WITH A THINNED ARRAY

(75) Inventor: Kenneth Abend, Huntingdon Valley, PA (US)

(73) Assignee: VueSonix Sensors Inc., Wayne, PA (US)

( * ) Notice: Subject to any disclaimer, the term of this patent is extended or adjusted under 35 U.S.C. 154(b) by 0 days.

(21) Appl. No.: 09/926,665

(22) PCT Filed: Jun. 14, 2000

(86) PCT No.: PCT/US00/16535

§ 371 (c)(1),
(2), (4) Date: Mar. 20, 2002

(87) PCT Pub. No.: WO00/76402

PCT Pub. Date: Dec. 21, 2000

(51) Int. Cl.[7] ................................................. A61B 8/00
(52) U.S. Cl. .................. 600/443; 600/439; 600/463; 600/128; 600/916
(58) Field of Search .................. 600/437, 439, 600/443, 463, 455; 128/916; 73/602, 606, 625

(56) References Cited

U.S. PATENT DOCUMENTS

| | | | |
|---|---|---|---|
| 5,409,010 A | | 4/1995 | Beach et al. |
| 5,546,807 A | * | 8/1996 | Oxaal et al. .................. 73/606 |
| 5,840,033 A | * | 11/1998 | Takeuchi .................... 600/443 |
| 5,922,962 A | | 7/1999 | Ishrak et al. |
| 6,066,096 A | * | 5/2000 | Smith et al. ................ 600/439 |

* cited by examiner

*Primary Examiner*—Marvin M. Lateef
*Assistant Examiner*—Ruby Jain
(74) *Attorney, Agent, or Firm*—McCarter & English, LLP; Allen N. Friedman, Esq.; Charles W. Fallow, Esq.

(57) ABSTRACT

A thinned array of ultrasound transducers includes plural transmitters configured so that each transmitter insonates one segment of a volume at a time and an array of receivers electronically aimed at and dynamically focused upon subsegments of the insonated segment. The spacing between receivers is greater than one-half the transmitted wavelength. Echoes are received in a pattern that is aligned with the insonates segment so that receiver grating lobes nearest the echoes coincide with first transmitter nulls, minimizing the deleterious effects of grating lobes.

12 Claims, 4 Drawing Sheets

FIG. 1A
FIG. 1B
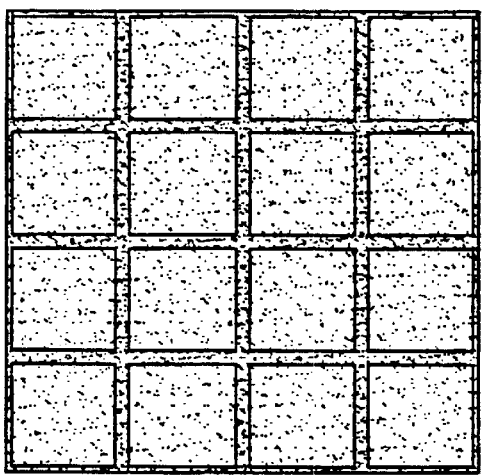
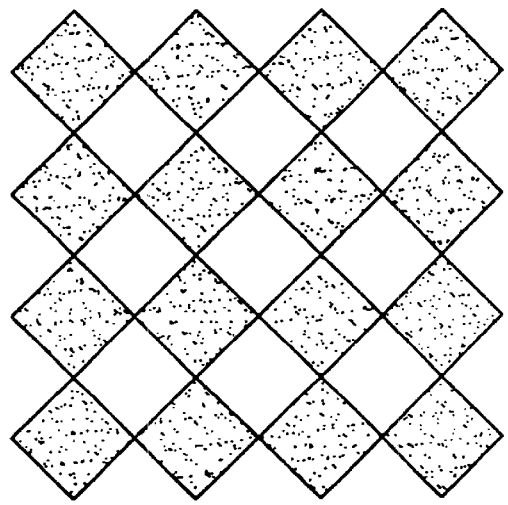
FIG. 2
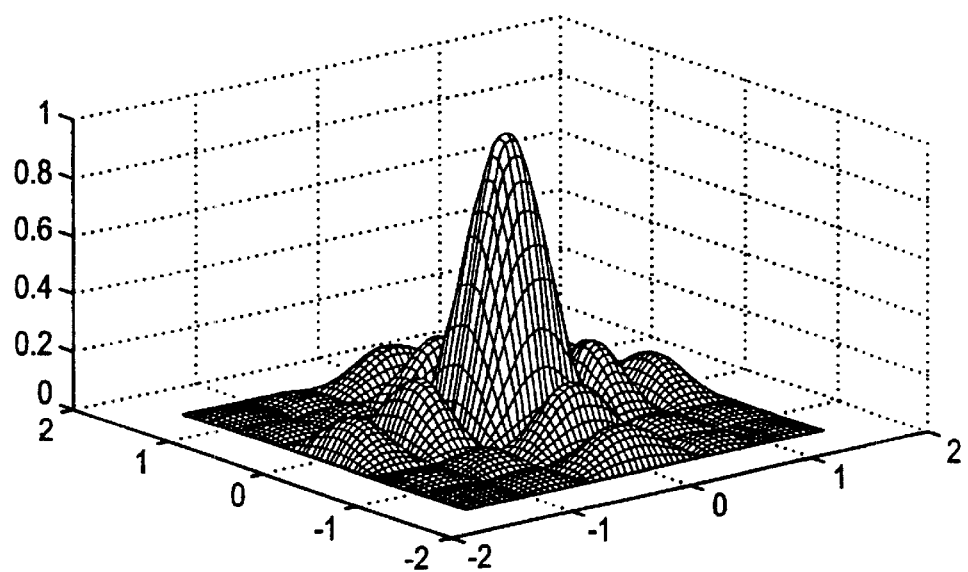

Transducer

8x8 Transmitter Beams (created sequentially)

Each transmitter beam is covered by 8x8 receiver beams (created simultaneously)

Transmitter 1.5 mm 15 mm

Receiver 0.2 mm

16 Receivers
8 Transmitters

16 Receivers
8 Transmitters

Transmitter

Receivers

64 Transmitters (total)
256 Receivers (total)

VOLUMETRIC ULTRASOUND IMAGING WITH A THINNED ARRAY

BACKGROUND OF THE INVENTION

Conventional ultrasound imaging equipment measures range and only one angle to produce a two dimensional slice through the organ being monitored. Typically, it produces a slice consisting of 256 lines in a 1/30 th of a second time frame. For each depth, this gives 256 picture elements or pixels per slice, one slice per frame. The difficulty that arises in three-dimensional imaging is that N slices require $N^2$ lines as opposed to N. A solution is to form many lines at a time.

Three dimensional ultrasound imaging systems currently exist, allowing any slice, at any orientation, to be displayed at the discretion of the user. For example, a particular system presently available employs a transmitter beam that insonifies a 4 by 4 array of 16 receiver beams. Since 16 beams are formed for each transmitted pulse, 16×256 lines are produced in each frame. This allows for the formation of a three dimensional image in a single frame, with a 64 by 64 array of pixels for each depth. However, this array of pixels limits the resolution of any 3D image produced with this system.

An ultrasonic device set forth in WO 00/072,756, which is hereby incorporated by reference in its entirety, provides for far more receive beams per pulse. In particular, an N by N receiver array described in the WO 00/072,756 application can provide $(N/2)^2$ simultaneous receive beams. Thus, choosing N=16, for example, produces an 8 by 8 array of 64 receiver beams for each transmitted pulse. Moreover, a device of the WO 00/072,756 application utilizes a planar array of rectangular ultrasound transducer elements comprising multiple transmitters and a thinned receiver array (elements are spaced more than ½ wavelength apart). A subset of the total aperture is used to transmit for a given time and insonate a number of receive beam positions without insonating the receiver grating lobes that result from thinning. In order to perform 3-dimensional ultrasound imaging, with a meaningful number of lines in two angular dimensions (called azimuth and elevation), it is necessary to scan a wide transmit beam so as to cover, say, a 90° sector (±45°) in both azimuth and elevation.

Thus, a device as described in the WO 00/072,756 application allows for a 128×128 array of pixels for each depth. Furthermore, a device of the WO 00/072,756 application utilizes a thinned array, reducing the number of array elements and resulting in far less cabling and input electronics.

However, a thinned array described in the WO 00/072,756 application has limited applications in evaluating a large volume of a subject's body. Thus, in order to make such an evaluation, it may be necessary to take data from a particular segment of the subject's body, and then physically move the thinned array to an adjacent segment for additional data taking.

Accordingly, what is needed is a thinned array that permits high-resolution imaging of a large volume a subject's body, without the necessity of relocating the array. Such a thinned array would improve the performance of presently known ultrasound devices, and further permit their use in fields such as cardiac diagnosis and monitoring.

What is also needed is a thinned array that has applications with any presently available or subsequently discovered ultrasound device.

What is also needed is a thinned array that is configured to suppress, or at least severely limit spatial ambiguities, or "grating lobes" that would interfere with the application of an ultrasound device, and decrease the resolution of a three dimensional image generated from echoes received from the subject's body.

The citation of any reference herein should not be construed as an admission that such reference is available as "Prior Art" to the instant application.

SUMMARY OF THE INVENTION

There is provided, in accordance with the present invention a novel, useful, and unobvious thinned array for use with an ultrasound device, that offers the advantage of permitting high-resolution imaging of a large volume of a subject's body.

Broadly, the present invention extends to a thinned array for use with an ultrasound device for evaluating a volume of a subject's body, wherein the volume is formed of a plurality of segments. Such a thinned array comprises:

(a) a plurality of transmitters configured so that one transmitter insonates one individual segment of the volume at a time; and (b) an array of receivers that simultaneously receive echoes from the volume being evaluated, wherein the array of receivers is electronically aimed and dynamically focused upon sub-segments of the insonated segment of the volume, wherein the spacing among the receivers in the array is greater than ½ the wavelength of the ultrasonic energy produced by the transmitters, and the receivers are configured to receive echoes from the sub-segments of the individual insonated segments of the volume of the subject's body in a pattern that is aligned with the insonated segment of the volume insonated by the transmitters, so that receiver grating lobes nearest the echoes coincide with first transmitter nulls, and the deleterious effects of grating lobes are minimized.

In a particular embodiment, the transmitters and receivers of a thinned array of the present invention are in a two-dimensional configuration. The shape of the transmitters can vary. Particular examples include, but certainly are not limited to rectangles, e.g., a square, and diamond shapes. In an embodiment wherein the transmitters are rectangular in shape, the transmitters are positioned flush against each.

As explained above a thinned array of the present invention also comprises a plurality of receivers that simultaneously receive echoes from the volume being evaluated, wherein the spacing of the receivers is greater than ½ the wavelength of the sonic energy produced by the transmitters. In a particular embodiment of the present invention, wherein the transmitters are diamond in shape, the receivers can optionally be interleaved with the transmitters.

Naturally, a thinned array of the present invention is electronically connected to a particular ultrasound device utilizing the thinned array.

Thus, a thinned (greater than ½ wavelength element spacing) array of ultrasound transducers of the present invention is used to form a large number of received and focused beams within an insonated volume. Since array thinning allows for scanning or imaging over only a limited region or segment, a set of transmitters are fired one at a time to insonate one segment at a time. The receiver is an array of receiver elements, all receiving simultaneously echoes from the volume of the subject's body insonated by the transmitters one at a time. A novel aspect of the present invention, wherein each particular transmitter insonates a segment of the volume subject's body, permits the insonation and evaluation of a larger volume the subject's body than can be evaluated with heretofore known thinned arrays. A large number of receive beams are formed digitally for each transmitted pulse, and each transmitter is designed to provide very little energy in the direction of undesired receiver spatial ambiguities or "grating lobes".

In another embodiment, the present invention extends to a thinned array for use with an ultrasound device for evaluating a volume of a subject's body, comprising:

(a) an array of transmitters having spacing that is greater than ½ the wavelength of the ultrasonic energy produced by the transmitters, and the array of transmitters are configured to insonate sub-segments of segments of the volume of the subject's body being evaluated, so that transmitter grating lobes coincide with first receiver nulls so that deleterious effects of grating lobes are minimized, and the array electronically scans the segments of the volume of the subject's body being evaluated, one sub-segment at a time; and (b) a plurality of receivers that simultaneously receive echoes from the sub-segments of the segments of the volume of the subject being evaluated, wherein each receiver points to a particular grating lobe of the transmitter pattern, or to a particular segment of volume.

Naturally, a thinned array of the present invention is electronically connected to a particular ultrasound device utilizing the thinned array.

Furthermore, the present invention extends to a method for insonating a volume of a subject with a thinned array for use with an ultrasound device, comprising the steps of:

(a) providing a thinned array for evaluating a volume of a subject's body, the thinned array comprising:

(i) a plurality of transmitters configured so that one transmitter insonates one individual segment of the volume at a time; and (ii) an array of receivers that simultaneously receive echoes from the volume being evaluated, wherein the array of receivers is electronically aimed and dynamically focused upon sub-segments of the insonated segment of the volume, wherein the spacing among the receivers in the array is greater than ½ the wavelength of the ultrasonic energy produced by the transmitters, and the receivers are configured to receive echoes from the sub-segments of the individual insonated segments of the-volume of the subject's body in a pattern that is aligned with the insonated segment of the volume insonated by the transmitters, so that receiver grating lobes nearest the echoes coincide with first transmitter nulls, and the deleterious effects of grating lobes are minimized; and (b) electrically connecting the thinned array to the ultrasound device, so that the volume of the subject can be ultrasonically evaluated.

Moreover, the present invention extends to a method for insonating a volume of a subject with a thinned array for use with an ultrasound device, comprising the steps of:

(a) providing a thinned array for evaluating a volume of a subject's body, the thinned array comprising:

(i) an array of transmitters having spacing that is greater than ½ the wavelength of the ultrasonic energy produced by the transmitters, and the array of transmitters are configured to insonate sub-segments of segments of the volume of the subject's body being evaluated, so that transmitter grating lobes coincide with first receiver nulls so that deleterious effects of grating lobes are minimized, and the array electronically scans the segments of the volume of the subject's body being evaluated, one sub-segment at a time; and (ii) a plurality of receivers that simultaneously receive echoes from the sub-segments of the segments of the volume of the subject being evaluated, wherein each receiver points to a particular grating lobe of the transmitter pattern, or to a particular segment of volume; and (b) electrically connecting the thinned array to the ultrasound device, so that the volume of the subject can be ultrasonically evaluated.

Accordingly, it is an object of the present invention to provide a novel and useful thinned array that permits high-resolution imaging of a large volume a subject's body, without the necessity of relocating the array.

It is another object of the present invention to provide a novel and useful thinned array that can be readily utilized with any presently known or subsequently developed ultrasound device.

It is yet another object of the present invention to provide a novel and useful thinned array that is configured to suppress, or at least substantially reduce grating lobes.

These and other aspects of the present invention will be better appreciated by reference to the following drawings and Detailed Description.

BRIEF DESCRIPTION OF THE DRAWINGS

FIG. 1 shows two possible N/r by M/s arrays of transmitters corresponding to an N by M receiver array, illustrated for the Case N/r=M/s=4. Each square or diamond represents a single transmitter. E.g., N=M=8 and r=s=2. The rectangular transmitter of FIG. 1A produces the sin x/x Pattern in Azimuth and in Elevation Shown in FIG. 2. FIG. 1B shows the second, or alternative, transmitter array. The diamond (smaller rotated) transmitters produce a $(\sin x/x)^2$ pattern in azimuth and in elevation as shown in FIG. 3a.

FIG. 2 shows a two-dimensional $\sin(2\pi x)/2\pi x$ pattern due to a uniformly weighted rectangular aperture as in FIG. 1A. Rotating and shrinking the aperture as shown in FIG. 1B rotates and expands the pattern. The resulting pattern is $(\sin \pi x/\pi x)^2$ in both azimuth and elevation as shown in FIG. 3A. This pattern can also be achieved by applying a triangular shading (amplitude weight taper) across the original (FIG. 1A) rectangular transmitter aperture. By way of example, assume the width (or height) of each transmitter is 2 d, where d is the spacing between elements in the N by M rectangular receive array.

FIG. 3 plots one-dimensional patterns for a 16 element linear receive array and a two-element long transmitter (N=16 and r=2).

DETAILED DESCRIPTION OF THE INVENTION

Figure 3A:
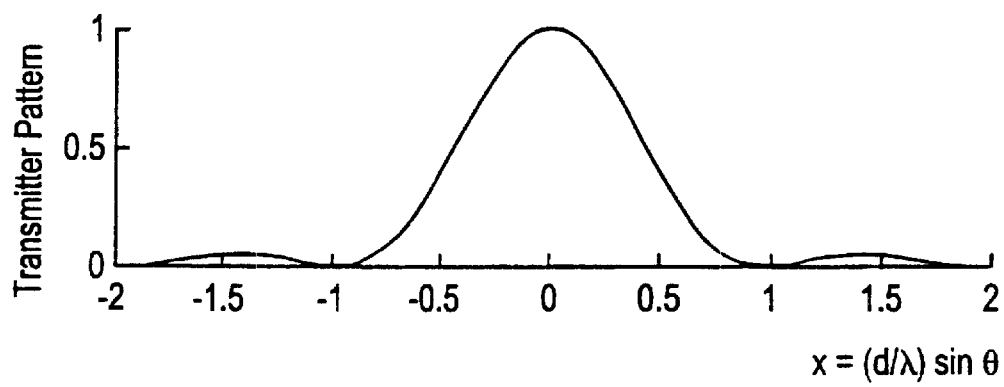
FIG. 3a shows the $(\sin \pi x/\pi x)^2$ pattern of a triangularly weighted transmitter.

The present invention is based upon the discovery that surprisingly and unexpectedly, a thinned array for use with an ultrasound device can be designed which permits evaluation of a large volume of a subject's body, and increases the number of resolution elements of ultrasound images obtained as compared with images obtained with heretofore known arrays.

In an embodiment, the present invention extends to a thinned array for use with an ultrasound device for evaluating a volume of a subject's body, and the thinned array is electrically connected to the ultrasound device, the thinned array comprising:

(a) a plurality of transmitters configured so that one transmitter insonates one individual segment of the volume at a time; and (b) an array of receivers that simultaneously receive echoes from the volume being evaluated, wherein the array of receivers is electronically aimed and dynamically focused upon sub-segments of the insonated segment of the volume, wherein the spacing among the receivers in the array is greater than ½ the wavelength of the ultrasonic energy produced by the transmitters, and the receivers are configured to receive echoes from the sub-segments of the individual insonated segments of the volume of the subject's body in a pattern that is aligned with the insonated segment of the volume insonated by the transmitters, so that receiver grating lobes nearest the echoes coincide with first transmitter nulls, and the deleterious effects of grating lobes are minimized.

In another embodiment, the present invention extends to a thinned array for use with an ultrasound device for evaluating a volume of a subject's body, comprising:

(a) an array of transmitters having spacing that is greater than ½ the wavelength of the ultrasonic energy produced by the transmitters, and the array of transmitters are configured to insonate sub-segments of segments of the volume of the subject's body being evaluated, so that transmitter grating lobes coincide with first receiver nulls so that deleterious effects of grating lobes are minimized, and the array electronically scans the segments of the volume of the subject's body being evaluated, one sub-segment at a time; and (b) a plurality of receivers that simultaneously receive echoes from the sub-segments of the segments of the volume of the subject being evaluated, wherein each receiver points to a particular grating lobe of the transmitter pattern, or to a particular segment of volume.

Furthermore, the present invention extends to a method for insonating a volume of a subject with a thinned array for use with an ultrasound device, comprising the steps of:

(a) providing a thinned array for evaluating a volume of a subject's body, the thinned array comprising:

(i) a plurality of transmitters configured so that one transmitter insonates one individual segment of the volume at a time; and (ii) an array of receivers that simultaneously receive echoes from the volume being evaluated, wherein the array of receivers is electronically aimed and dynamically focused upon sub-segments of the insonated segment of the volume, wherein the spacing among the receivers in the array is greater than ½ the wavelength of the ultrasonic energy produced by the transmitters, and the receivers are configured to receive echoes from the sub-segments of the individual insonated segments of the volume of the subject's body in a pattern that is aligned with the insonated segment of the volume insonated by the transmitters, so that receiver grating lobes nearest the echoes coincide with first transmitter nulls, and the deleterious effects of grating lobes are minimized; and (b) electrically connecting the thinned array to the ultrasound device, so that the volume of the subject can be ultrasonically evaluated.

Moreover, the present invention extends to a method for insonating a volume of a subject with a thinned array for use with an ultrasound device, comprising the steps of:

(a) providing a thinned array for evaluating a volume of a subject's body, the thinned array comprising:

(i) an array of transmitters having spacing that is greater than ½ the wavelength of the ultrasonic energy produced by the transmitters, and the array of transmitters are configured to insonate sub-segments of segments of the volume of the subject's body being evaluated, so that transmitter grating lobes coincide with first receiver nulls so that deleterious effects of grating lobes are minimized, and the array electronically scans the segments of the volume of the subject's body being evaluated, one sub-segment at a time; and (ii) a plurality of receivers that simultaneously receive echoes from the sub-segments of the segments of the volume of the subject being evaluated, wherein each receiver points to a particular grating lobe of the transmitter pattern, or to a particular segment of volume; and (b) electrically connecting the thinned array to the ultrasound device, so that the volume of the subject can be ultrasonically evaluated.

Numerous terms and phrases are used throughout the instant specification and appended claims.

As used herein, the phrase "element spacing" or "spacing" can be used interchangeably and refer to the distance between the center of receivers or transmitters of a thinned array of the present invention. In one embodiment of the present invention described above, the spacing between transmitters is greater than ½ the wavelength of ultrasonic energy produced by the transmitters. In another embodiment described above, the spacing between the receivers is greater than ½ the wavelength of the ultrasonic energy produced by the transmitters.

As used herein, the phrase "electronically aimed" with respect to an array of receivers or transmitters of a thinned array of the present invention means that phase shifts or delays are applied to the individual elements so that a beam is steered or focused on a partiular segment or sub-segement of the volume of the subject being evaluated.

As used herein, the phrase "dynamically focused" with respect to transducers of a thinned array of the present invention means that the phase shifts can vary with time so as to depend on range or depth.

In addition, the phase "first transmitter nulls" as used herein refers to places nearest the insonated segment of the volume of the subject's body being evaluated where the transmitter power is zero or near zero.

As used herein, the phrase "transmitter sidelobe patterns" refers to the angular distribution of transmitted energy outside the segment intentionally insonated.

As used herein, the terms "transducer" and "element" refer to transmitters and/or receivers of ultrasonsic energy.

Hence, contrary to heretofore known thinned arrays for use with ultrasound devices, an embodiment of a thinned array of the present invention, as described above, utilizes set of dedicated transmit apertures, each permanently aimed in a different direction. If, for example, the receive array is to be electronically scanned over the entire 90° by 90° sector, the receiver array elements must be wide-angle, covering an entire octant without significant attenuation.

In another embodiment of a thinned array of the present invention, dedicated receiver apertures are used, and the transmitter array is thinned as described herein.

The present invention may be better understood by reference to the following non-limiting Examples, which are provided as exemplary of the invention. The following Examples are presented in order to more fully illustrate the preferred embodiments of the invention. They should in no way be construed, however, as limiting the broad scope of the invention.

EXAMPLE I

For simplicity, assume an example of a square array, where the receivers lie on a N by N grid, at a spacing of d for both the horizontal and vertical directions. In this case, the transmitters illustrated in FIG. 1 would each be 2 d wide and 2 d high. High-resolution dynamic volumetric imaging, could, for example, require a 16 by 16 receiver array and hence an 8 by 8 array of 64 transmitters (N=16). The two-dimensional amplitude pattern of a 2 d×2 d square transmitter aperture is plotted as a function of $x=(d/\lambda) \sin \theta$ and $y=(d/\lambda) \sin \phi$ in FIG. 2.

Since the receivers are not directive by themselves, suppression of grating lobes must be accomplished entirely by the transmitter pattern. Hence triangular shading is used to produce a low-sidelobe $(\sin \pi x/\pi x)^2$ pattern in both x and y (corresponding to azimuth and elevation) This is illustrated in FIG. 3, (showing azimuth only) for the case of N=16.

For example, if f=4 MHz, then $\lambda=c/f=1.540/4=0.385$ mm. Making d slightly less than 1 mm (so that the receiver array is 1.5 cm by 1.5 cm), results in $d/\lambda \approx 2.5$. Thus, in this example, the thinning is five to one, resulting in a reduction in the number of elements in the two dimensional array by a factor of 25.

Figure 3B:
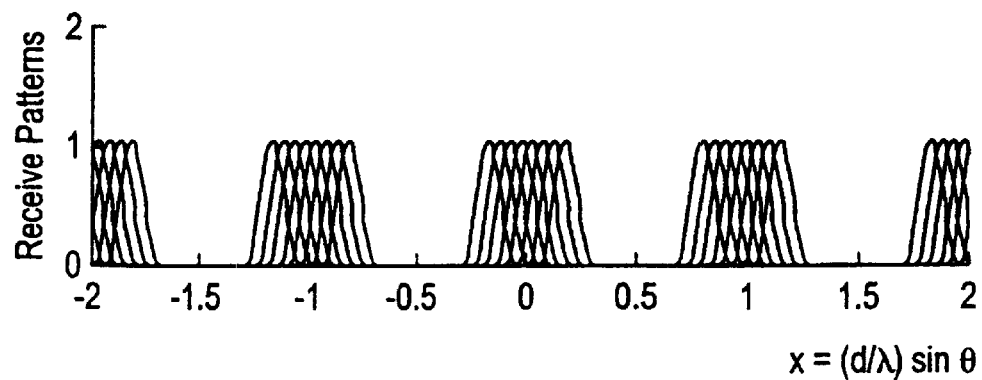
FIG. 3b shows a cluster of eight receiver beams along With the grating lobes of a thinned receiver array.
Figure 3C:
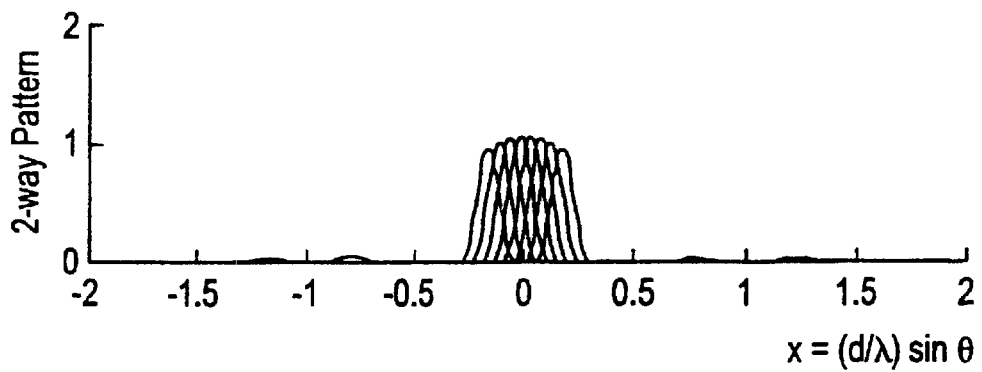
FIG. 3c shows the resultant two-way beam pattern with grating lobes suppressed. The two-dimensional counterpart of FIG. 3 would use an 8×8 array of diamond-shaped uniformly weighted transmitters and a 16 by 16=256 element planar receive array. This would produce an 8 by 8 cluster of 64 received beams.
Figure 4:
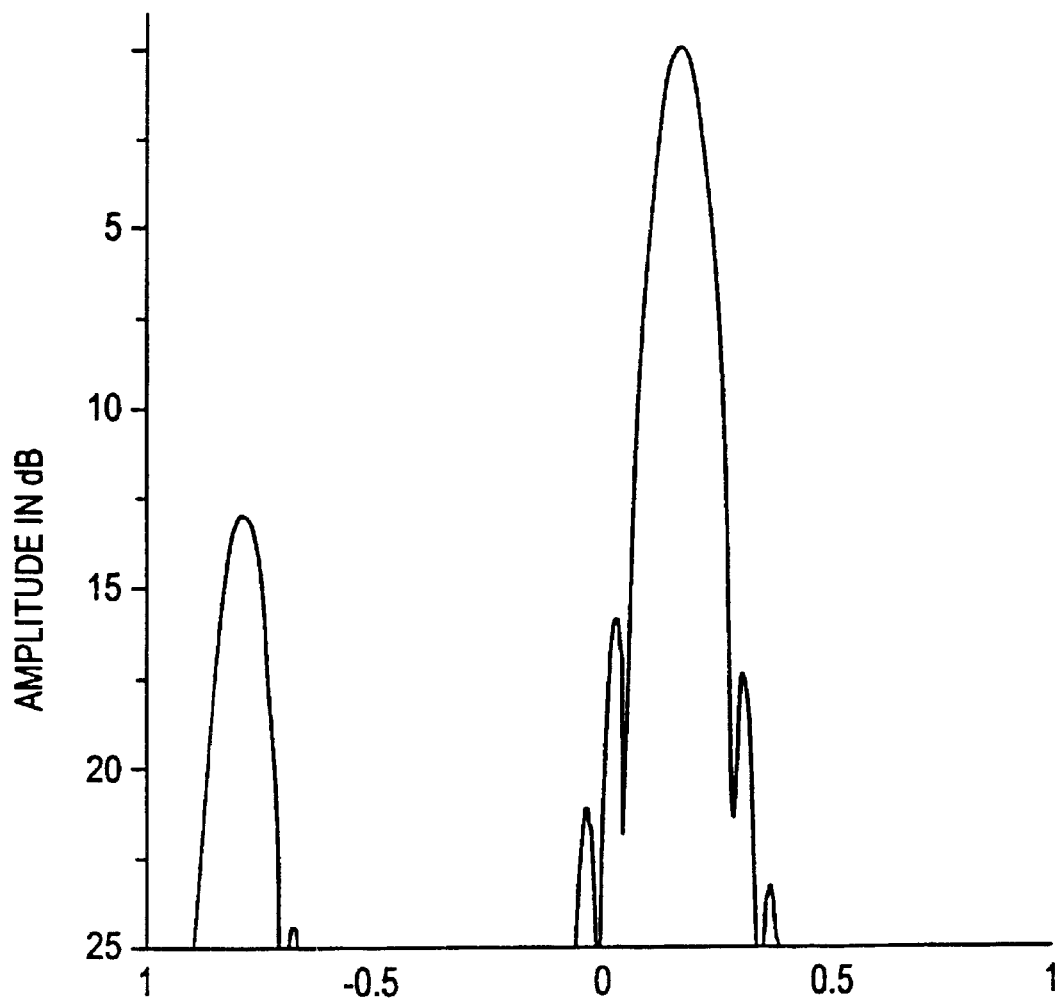
FIG. 4 shows the two-way pattern of beam number 8 in FIG. 3C plotted in dB. In this case, the grating lobe is suppressed by 12.5 dB.

FIGS. 3 and 4 were created using the following MATLAB program:

```
x=-2:1/128:2-1/128;
p=pi*x+eps; T=(sin(p)./p).^2;
N=16
n=0:N-1;
xo=-.175:.05:.175;
w=hanning(N);
   e=(1/N)*ones N,N)*e;
for k=1:8;
   e=exp(j*n'*2*pi*(x-xo(k)));
   E(k,:)=(2/N)*w'*e;
   TE(k,:)=abs(T).*abs(E(k,:))
end
subplot(311); plot(x,abs(T));
ylabel('a. Transmitter Pattern')
subplot(312); plot(x,abs(E));
ylabel('b. Receive Patterns')
subplot(313); plot(x,TE);
ylabel('c. 2-way Pattern')
figure(2); plot(x,10*log 10(TE(8,:)));
zoom on;
```

FIG. 3a shows the transmitter pattern as a function of x. FIG. 3b shows the pattern of a 16 element linear array, using Hanning weighting and steered to 8 different values of x, with $|x|<0.2$. This corresponds to an 8×8 cluster of 64 receiver beams that are digitally produced for each transmitted pulse. Since there are 64 transmitters, each aimed and focused at a different region, 4096 lines are formed in only 64 pulses. This is ¼ the time it takes a conventional ultrasound imager to produce only 256 lines. Furthermore, only 256 receiver elements and 64 transmitter apertures were used.

Figure 5:
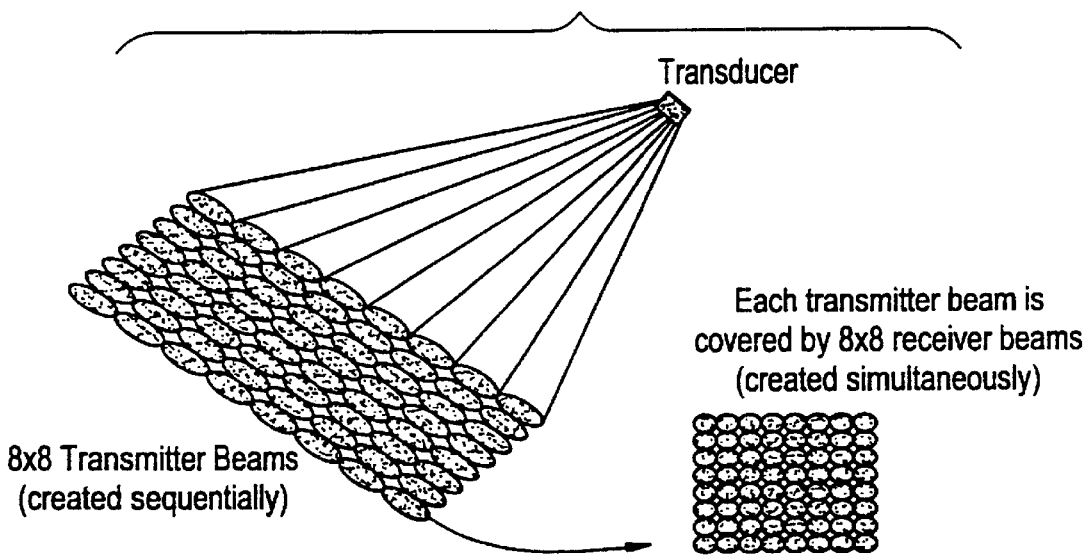
FIG. 5 shows the beam configuration for 3-D Imaging with $(N/2)^2$ by $(N/2)^2$ beams formed by $(N/2)^2$ Transmissions and an N by N receiver array, illustrated for the Case of N=16.

The resulting beam cluster is illustrated in azimuth only in FIG. 3c. In general, the origin (x=0) of FIG. 3 will be translated to correspond to the azimuth angle of the center of the current transmit beam. FIG. 4 plots the rightmost beam of FIG. 3c in dB, to show that the grating lobes are attenuated by at least 25 dB. FIG. 5 shows the beam configuration in two angular dimensions, where FIG. 3c is a horizontal cut through the receiver beams illustrated in FIG. 5. The addition of time delay or depth (range) results in a 3-D image. The 4 to 1 reduction in imaging time allows for increased volumes per second for 3-D color flow imaging.

Figure 6:
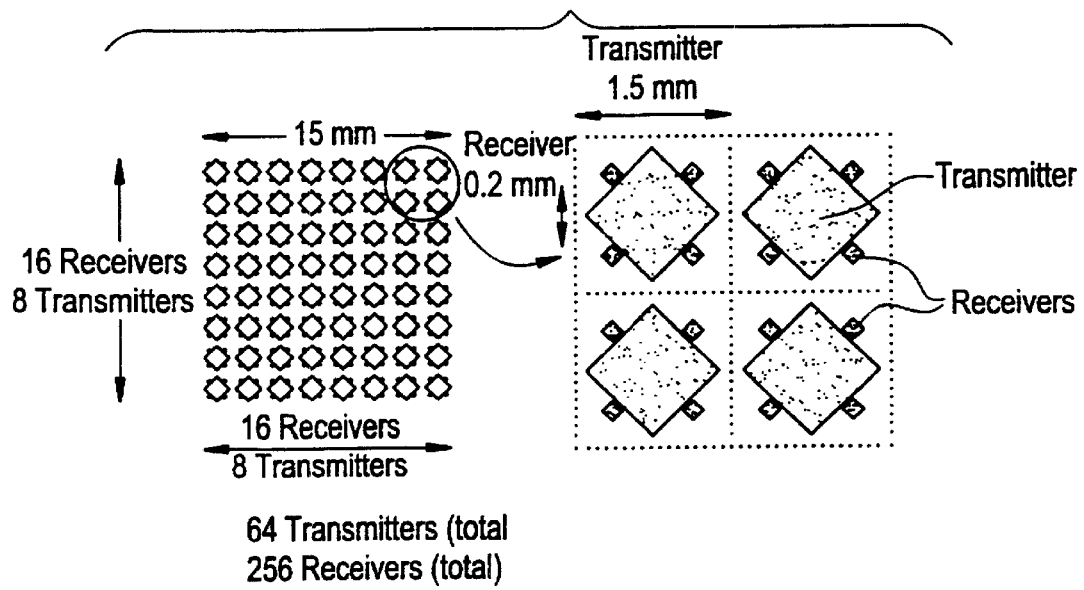
FIG. 6 shows an example of interleaving the receiver array elements with the transmitter array.

As explained above, conventional imagers view a single slice, with between 64 and 256 lines or beams. This invention views a three dimensional volume with a 64 by 64 array of lines in ¼ the time. The array, is bistatic. However, the transmitters and the receiver elements could be interleaved as shown in FIG. 6. Alternatively, the arrays could be kept separate and the number of transmitters (and hence the total number of lines) can be doubled by filling in the blank spaces of FIG. 1b with another set of $(N/2)^2$ elements. By way of example, this doubles the number of transmit beams in FIG. 5 (left hand side) so that 8192 beams are created using only 256 receiver elements. By doubling the overall size of the transmitter array, a total of 16384 beams can be formed.

The signal processing utilized with a thinned array of the invention can be, for example, the processing described in the '364 application described above. However, a thinned array of the present invention utilizes a set of electronically-aimed fixed-focus transmitters to extend the region imaged beyond the limit imposed by the necessity to avoid grating lobes of a thinned receive array. Heretofore known thinned arrays do not utilize electronically-aimed and fixed-focus transmitters. Moreover, note that the expanded angular field being imaged with a thinned array of the present invention permits its use for diagnostic, monitoring, and therapeutic applications. Tracking procedures such as those described in the '364 application can keep the near-field array focused at desired points in 3-D space so as to heat or destroy unwanted tissue, gall stones, kidney stones, etc., or maintain critical positioning of the image relative to some other device. Since a 3-D image is formed, tracking in three dimensions can also be achieved through image correlation.

EXAMPLE II

In the embodiment of the present invention set forth in Example I above, FIG. 3a represents the pattern of one of the transmitters, FIG. 3b represents a set of digitally-formed simultaneously-received beams using a thinned receiver array, and FIG. 3c is the product of the two. By sequentially using different transmitters, a large region can be imaged.

In the embodiment of the present invention set forth in this example, the roles of transmitter and receiver are interchanged. Thus, for purposes of this embodiment, FIG. 3b illustrates the sequential scanning of a transmit beam (and its grating lobes) using a thinned transmitter array.

Also, for purposes of the embodiment set forth in this example, FIG. 3a illustrates the pattern of one of multiple receivers, designed to each receive signals from only one grating lobe. FIG. 3c (the two-way pattern) is the product of the two. Multiple receivers can all receive energy at once, each from a different transmitter grating lobe.

The embodiment set forth in this example has the advantage of requiring less computation because the electronically-steered phased-array transmit beams are formed one at a time, while the multiple receivers are fixed-focus.

Many other variations and modifications of the present invention will be apparent to those skilled in the art without departing from the spirit and scope of the present invention. The above-described embodiments are, therefore, intended to be merely exemplary, and all such variations and modifications are intended to be included within the scope of the present invention as defined in the appended claims.

What is claimed is:

1. A thinned array for use with an ultrasound device for evaluating a volume of a subject's body, the thinned array being electrically connected to said ultrasound device, said thinned array comprising:
   (a) a plurality of transmitters configured so that one transmitter insonates one individual segment of said volume at a time; and
   (b) an array of receivers that simultaneously receive echoes from said volume being evaluated, where said array of receivers is electronically aimed and dynamically focused upon sub-segments of said insonated segment of said volume, wherein said receivers in said array have a spacing that is greater than ½ the wavelength of ultrasonic energy produced by said transmitters, and said receivers are configured to receive echoes from said sub-segments of said individual insonated segments of said volume of the subject's body in a pattern that is aligned with said insonated segment of the volume insonated by the transmitters, so that receiver grating lobes nearest the echoes coincide with first transmitter nulls, and the deleterious effects of grating lobes are minimized.

2. The thinned array of claim 1, wherein said transmitters and receivers are in a two dimensional configuration.

3. The thinned array of claim 2, wherein said transmitters and receivers are rectangular in shape, and are positioned flush against each other in said thinned array.

4. The thinned array of claim 2, wherein said transmitters are diamond in shape to reduce transmitter sidelobe patterns, which improves depression of receiver grating lobes.

5. The thinned array of claim 4, wherein said receivers are interleaved with said transmitters.

6. A thinned array for use with an ultrasound device for evaluating a volume of a subject's body, the thinned array being electrically connected to said ultrasound device, the thinned array comprising:
   (a) an array of transmitters having spacing that is greater than ½ wavelength of ultrasonic energy produced by said transmitters, wherein the array of transmitters are configured to insonate sub-segments of segments of the volume of the subject's body being evaluated, so that transnitter grating lobes coincide with first receiver nulls so that deleterious effects of grating lobes are minimized, and the array electronically scans the segments of the volume of the subject's body being evaluated, one sub-segment at a time; and
   (b) a plurality of receivers that simultaneously receive echoes from the sub-segments of the segments of the volume of the subject being evaluated, wherein each receiver points to a particular grating lobe of a transmitter pattern, or to a particular segment of volume.

7. A method for insonating a volume of a subject with a thinned array for use with an ultrasound device, comprising the steps of:
   (a) providing a thinned array for evaluating a volume of a subject's body, the thinned array comprising:
      (i) a plurality of transmitters configured so that one transmitter insonates one individual segment of the volume at a time; and
      (ii) an array of receivers that simultaneously receive echoes from the volume being evaluated, wherein the array of receivers is electronically aimed and dynamically focused upon sub-segments of the insonated segment of the volume, where the receivers in the array have a spacing is greater than ½ wavelength of ultrasonic energy produced by the transmitters, and the receivers are configured to receive echoes from the sub-segments of the individual insonated segments of the volume of the subject's body in a pattern that is aligned with the insonated segment of the volume insonated by the transmitters, so that receiver grating lobes nearest the echoes coincide with first transmitter nulls, and deleterious effects of grating lobes are minimized; and
   (b) electrically connecting the thinned array to the ultrasound device, so that the volume of the subject can be ultrasonically evaluated.

8. The method of claim 7 wherein the transmitters and receivers are in a two dimensional configuration.

9. The method of claim 7, wherein the transmitters and receivers are rectangular in shape, and are positioned flush against each other in the thinned array.

10. The method of claim 7, wherein the transmitters are diamond in shape to reduce transmitter sidelobe patterns, which improves depression of receiver grating lobes.

11. The method of claim 10, wherein the receivers are interleaved with the transmitters.

12. A method for insonating a volume of a subject with a thinned array for use with an ultrasound device, comprising the steps of:
   (a) providing a thinned array for evaluating a volume of a subject's body, the thinned array comprising:
      (i) an array of transmitters is greater than ½ wavelength of ultrasonic energy produced by the transmitters, and the array of transmitters are configured to insonate sub-segments of segments of the volume of the subject's body being evaluated, so that transmitter grating lobes coincide with first receiver nulls so that deleterious effects of grating lobes are minimized, and the array electronically scans the segments of the volume of the subject's body being evaluated, one sub-segment at a time; and
      (ii) a plurality of receivers that simultaneously receive echoes from the sub-segments of the segments of the volume being evaluated, wherein each receiver points to a particular grating lobe of the transmitter pattern, or to a particular segment of the volume; and
   (b) electrically connecting the thinned array to the ultrasound device, so that the volume of the subject can be ultrasonically evaluated.

* * * * *

UNITED STATES PATENT AND TRADEMARK OFFICE
CERTIFICATE OF CORRECTION

PATENT NO. : 6,524,253 B1  
DATED : February 25, 2003  
INVENTOR(S) : Abend

It is certified that error appears in the above-identified patent and that said Letters Patent is hereby corrected as shown below:

<u>Title page,</u>  
Insert -- Related U.S. Application Data  
[60] Provisional application No. 60/138782, filed on June 14, 1999. --

<u>Column 1,</u>  
Line 3, insert -- This application claims the benefit of provisional patent application 60/138782, filed June 14, 1999. --

Signed and Sealed this

Twenty-first Day of October, 2003

JAMES E. ROGAN  
*Director of the United States Patent and Trademark Office*